(12) United States Patent
Ishii et al.

(10) Patent No.: US 10,093,154 B2
(45) Date of Patent: Oct. 9, 2018

(54) AIR CONDITIONING DEVICE FOR VEHICLE

(71) Applicant: KEIHIN CORPORATION, Tokyo (JP)

(72) Inventors: Yusuke Ishii, Tochigi-ken (JP);
Tsutomu Kobari, Fishers, IN (US)

(73) Assignee: KEIHIN CORPORATION, Tokyo (JP)

( * ) Notice: Subject to any disclaimer, the term of this patent is extended or adjusted under 35 U.S.C. 154(b) by 97 days.

(21) Appl. No.: 15/129,974

(22) PCT Filed: Feb. 18, 2015

(86) PCT No.: PCT/JP2015/054414
§ 371 (c)(1),
(2) Date: Sep. 28, 2016

(87) PCT Pub. No.: WO2015/151617
PCT Pub. Date: Oct. 8, 2015

(65) Prior Publication Data
US 2017/0136852 A1  May 18, 2017

(30) Foreign Application Priority Data
Mar. 31, 2014  (JP) .................. 2014-071012

(51) Int. Cl.
*B01D 46/00* (2006.01)
*B60H 3/06* (2006.01)
*B60H 1/00* (2006.01)

(52) U.S. Cl.
CPC ....... *B60H 3/0616* (2013.01); *B01D 46/0006* (2013.01); *B60H 1/00849* (2013.01); *B60H 3/0608* (2013.01); *B60H 2003/065* (2013.01)

(58) Field of Classification Search
CPC .......... B01D 46/52; B01D 27/00; B60H 3/06; B60H 1/32; B60H 1/00521;
(Continued)

(56) References Cited

U.S. PATENT DOCUMENTS 6,280,316 B1 * 8/2001 Loup .................. B60H 1/00521
454/158
6,440,189 B1 * 8/2002 Sugano ............. B60H 1/00514
123/198 E (Continued)

FOREIGN PATENT DOCUMENTS

JP       59-230816      12/1984
JP       2000-006636    1/2000

(Continued)

OTHER PUBLICATIONS

International Search Report, dated May 26, 2015 (dated May 26, 2015).

(Continued)

*Primary Examiner* — Duane Smith
*Assistant Examiner* — Minh Chau T Pham
(74) *Attorney, Agent, or Firm* — Rankin, Hill & Clark LLP

(57) ABSTRACT

A filter insertion opening into which a filter is inserted is formed in an indoor-air/outdoor-air switching unit, which constitutes an air conditioning device for a vehicle, and a guide section for guiding the filter downstream in the insertion direction is provided on the inner wall surface of a casing so as to face the filter insertion opening. The guide section has: a first lower guide facing the filter insertion opening and tilted upward; and a second lower guide formed downstream of the first lower guide in the insertion direction and tilted downward. When inserting the filter from the filter insertion opening, the filter is guided along the first lower guide and therefore is inserted while being tilted such that the end of the filter, which is located downstream in the insertion direction, is lifted up. Consequently, the filter can be inserted without contact with the vehicle body-side structure.

4 Claims, 4 Drawing Sheets

(58) Field of Classification Search
CPC ............ B60H 1/00514; B60H 1/00064; B60H 1/00028; F24F 13/08
USPC ......... 55/385.3, 497, 511, 521, 490.1, 467.1, 55/320, 506; 123/198 E; 454/139, 158; 165/63
See application file for complete search history.

(56) References Cited

U.S. PATENT DOCUMENTS

2009/0032216 A1* 2/2009 Kim .................. B60H 1/00064
                                                        165/63
2012/0317937 A1* 12/2012 Koch ................ B60H 1/00028
                                                        55/320

FOREIGN PATENT DOCUMENTS

| JP | 2006-044483 | 2/2006 |
| JP | 2009-073234 | 4/2009 |
| JP | 2012-236437 | 12/2012 |
| JP | 2013-136259 | 7/2013 |
| KR | 100735906 B1 | 7/2007 |

OTHER PUBLICATIONS

Chinese Office Action with English translation dated Jan. 19, 2018, 12 pages.

* cited by examiner

US 10,093,154 B2

AIR CONDITIONING DEVICE FOR VEHICLE

TECHNICAL FIELD

The present invention relates to a vehicular air conditioning device that is mounted in a vehicle for adjusting the temperature in the interior of a vehicle cabin by blowing air, which is taken in by a blower and the temperature of which is adjusted, into the vehicle cabin.

BACKGROUND ART

A vehicular air conditioning device, which is mounted in a vehicle, takes in inside air and outside air through an inside/outside air switching unit into an air conditioner case, and after mixing chilled air, which is cooled by an evaporator type of cooling means, and heated air, which is heated by a heater core type of heating means, inside the air conditioner case at a desired mixing ratio, the mixed air is blown selectively from a plurality of respective outlet ports disposed in the vehicle cabin interior, whereby adjustment of temperature and humidity is carried out in the interior of the vehicle cabin.

In the inside/outside air switching unit, for example, as disclosed in Japanese Laid-Open Patent Publication No 2009-073234, at a position on an upstream side of the blower, a filter is provided for removing dust and the like that is contained in the outside air. By the outside air passing through the filter, air from which dust and the like has been removed is supplied into the interior of the case. Further, by being arranged at a predetermined angle of inclination with respect to the blower that is disposed therebelow, the filter is separated with respect to an involute shaped air blowing passage disposed on the outer circumferential side of the blower, whereby blown air resistance is reduced.

SUMMARY OF INVENTION

Generally, the filter that is used with the above-described vehicular air conditioning device is disposed in an insertable and removable manner through a filter insertion opening that opens on a side of the case. For example, in the event that the filter becomes clogged due to adherence of dust or the like, it is taken out from the insertion opening and replaced with a new filter.

With the vehicular air conditioning device including the aforementioned inside/outside air switching unit, when mounted in a vehicle, a vehicle body side structural member such as a steering stay or the like for supporting a steering device is arranged in the vicinity of the filter insertion opening. In the case that the filter is exchanged under such an environment, it becomes problematic to insert the filter in a slanted direction through the insertion opening while avoiding the vehicle body side structural member. Further, with a relationship such as one in which a duct is routed to blow air into the passenger compartment, the positioning of an introduction port of the inside/outside air switching unit that is connected to the duct is decided beforehand, and in this case, the space to fix the filter in place is limited.

Furthermore, in the case that the insertion direction of the filter is inclined upwardly toward the insertion direction, at the time of insertion or when a lid or cover member is taken out of the filter insertion opening, the filter tends to slide down unexpectedly under the action of gravity.

A general object of the present invention is to provide an air conditioning device for a vehicle, which enables a filter to be easily exchanged while avoiding a vehicle body side structural member, and which can also prevent falling out of the filter.

The present invention is characterized by an air conditioning device for a vehicle, comprising a casing, an introduction port formed in the casing and inside air or outside air being introduced through the introduction port, a blower configured to take in air through the introduction port under a driving operation, and an involute shaped air blowing passage, the air that is taken in by the blower being blown out through the air blowing passage, and further comprising an inside/outside air switching unit, a filter being accommodated in an interior of the inside/outside air switching unit through an insertion opening that is formed in the casing.

A guide member configured to guide the filter along an insertion direction from the insertion opening to the interior is provided on an inner wall surface of the casing, wherein the guide member, at a time that the filter begins to be inserted from the insertion opening, inclines a rear side in the insertion direction of the filter upwardly, and further rotates the filter midway during insertion thereof, whereby when the filter is accommodated, a front side in the insertion direction of the filter is in an upwardly inclined state.

According to the present invention, in the inside/outside air switching unit of the vehicular air conditioning device, on the inner wall surface of the casing, there is provided the guide member that guides the filter along an insertion direction from the insertion opening to the interior. At the time that the filter begins to be inserted from the insertion opening, a rear side in the insertion direction of the filter is inclined upwardly by the guide member, and further, the filter is tilted midway during insertion thereof, whereby when the filter is accommodated, a front side in the insertion direction of the filter is in an upwardly inclined state.

Consequently, in a case in which the vehicle body side structural member is arranged in the vicinity of the insertion opening in the casing, when the filter is inserted, it is tilted by the guide member such that a front side thereof in the insertion direction is oriented downward, whereby the insertion operation can be carried out in a state in which the filter is suitably separated from and does not come into contact with the vehicle body side structural member. Further, because the filter is accommodated in an inclined state such that a rear side thereof in the insertion direction is downwardly oriented by the guide member inside the casing, in the inside/outside air switching unit, a large distance from the lower surface of the filter to the air blowing passage can be assured, blown air resistance when air flows under a driving action of the blower can be reduced, and sliding down of the filter to the outside from the insertion opening under the action of gravity is prevented.

DESCRIPTION OF EMBODIMENTS

Figure 1:
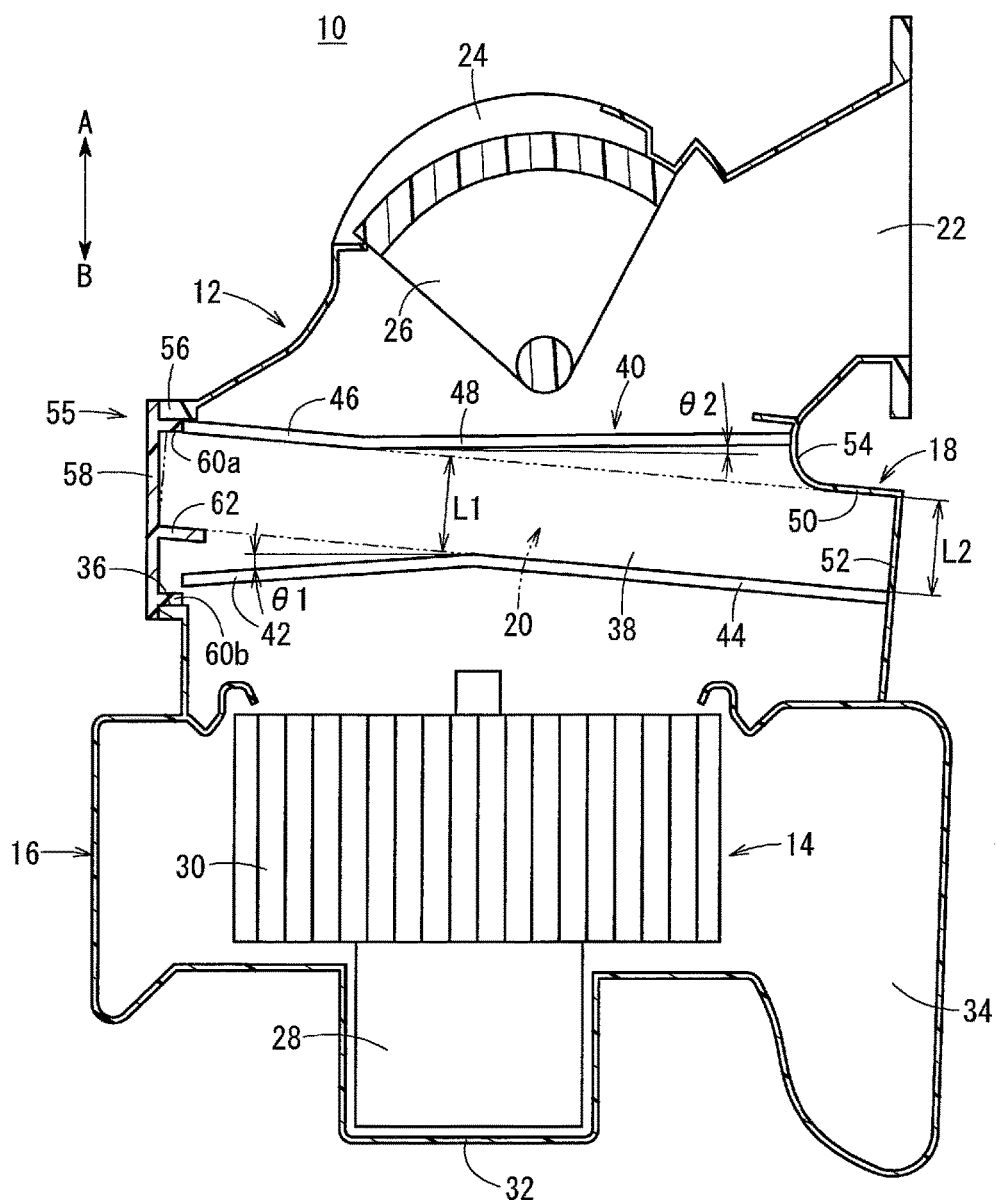
FIG. 1 is an overall cross-sectional view of an inside/outside air switching unit in a vehicular air conditioning device according to an embodiment of the present invention.

As shown in FIG. 1, a vehicular air conditioning device 10 includes an air conditioner case (not shown) in which respective airflow passages are provided, and an inside/outside air switching unit 12 connected to a side portion of the air conditioner case, for blowing the air to respective passages in the air conditioner case. In the interior of the air conditioner case, there are provided an evaporator for cooling the supplied air, a heater core for heating the air, and a damper mechanism or the like, which operates to switch the flow of air that flows through and inside each of the respective passages.

As shown in FIG. 1, the inside/outside air switching unit 12 includes a blower case 16 in which a blower 14 is accommodated in the interior thereof, a casing 18 disposed upwardly of the blower case 16, a filter 20 that is accommodated in the interior of the casing 18, and a switching damper 26 that switches between an inside air introduction port 22 and an outside air introduction port 24 of the casing 18.

The blower case 16 is formed in a bottomed cylindrical shape with the upper portion thereof opened, and the blower 14 is disposed substantially in the center thereof. The blower 14 includes a drive motor 28 disposed in a central portion, and a blower fan 30 connected to a drive axis of the drive motor 28. A portion of the drive motor 28 is retained by insertion thereof into an accommodating part 32 disposed below the blower case 16.

Further, in the blower case 16, there is formed an involute shaped air blowing passage 34, which is formed so as to gradually widen outwardly in a radial direction and a height direction centrally about the blower 14.

In addition, the blower fan 30 is rotated by the drive motor 28 being rotary driven, and air is sucked into the blower case 16 from the casing 18 by fins of the blower fan 30, whereupon the air that flows along the air blowing passage 34 of the blower case 16 is blown out to the side of a non-illustrated air conditioner case.

The casing 18, for example, comprises the outside air introduction port 24 that opens upwardly (in the direction of the arrow A) and through which air outside of the vehicle is introduced, the inside air introduction port 22 that is disposed adjacent to the outside air introduction port 24, opens in a sideways direction (the direction of the arrow C1), and through which air inside of the vehicle is introduced, a filter insertion opening 36 that opens in a sideways direction (the direction of the arrow C2) on an opposite side from the inside air introduction port 22 and through which the filter 20 is inserted, and a filter accommodating section 38 that communicates with the filter insertion opening 36 and in which the filter 20 is accommodated.

In the interior of the casing 18, a guide member 40 is formed that communicates with the filter insertion opening 36 and extends in a substantially horizontal direction (the directions of the arrow C) from the filter insertion opening 36. The guide member 40 is formed respectively on both side walls along a lateral direction of the filter accommodating section 38 in the casing 18, and is formed to project at a predetermined height with respect to both side walls.

The guide member 40 comprises a first lower guide 42, which extends toward a rear side in the insertion direction (in the direction of the arrow C1) of the filter 20 from a lower end vicinity of the filter insertion opening 36 and is inclined upwardly (in the direction of the arrow A) at a predetermined angle, and a second lower guide 44, which extends toward the rear side in the insertion direction (in the direction of the arrow C1) from an end on a rear side in the insertion direction (in the direction of the arrow C1) of the first lower guide 42 and is inclined downwardly (in the direction of the arrow B) at a predetermined angle.

The guide member 40 comprises a first upper guide 46, which extends toward a rear side in the insertion direction (in the direction of the arrow C1) of the filter 20 from an upper end vicinity of the filter insertion opening 36 and is inclined downwardly (in the direction of the arrow B) at a predetermined angle, a second upper guide 48, which extends toward the rear side in the insertion direction (in the direction of the arrow C1) from an end on a rear side in the insertion direction (in the direction of the arrow C1) of the first upper guide 46 and is inclined upwardly (in the direction of the arrow A) at a predetermined angle, and a third upper guide 50, which is formed on a rear side in the insertion direction (in the direction of the arrow C1) with respect to the second upper guide 48, and is disposed on a line of extension of the first upper guide 46.

The first lower guide 42, for example, is formed in a straight line shape toward the rear side in the direction of insertion (in the direction of the arrow C1), and extends up to a position slightly more on the front side than a substantially center location along the direction of insertion (the directions of the arrow C) of the filter 20 in the casing 18.

The second lower guide 44 is formed such that the rear side thereof in the direction of insertion (in the direction of the arrow C1) descends downwardly (in the direction of the arrow B) with respect to an end of the first lower guide 42, and extends in a straight line shape up to an inner wall surface 52 of the casing 18 that is formed on the rear side in the direction of insertion (in the direction of the arrow C1). More specifically, the first and second lower guides 42, 44 that make up the guide member 40 are formed in a mountain-like shape with a substantially central portion thereof projecting upwardly (in the direction of the arrow A).

The first upper guide 46 faces toward the first lower guide 42, is formed in a straight line shape toward the rear side in the direction of insertion (in the direction of the arrow C1), extends up to a position slightly more on the front side in the direction of insertion (in the direction of the arrow C2) than a substantially center location along the direction of insertion (the directions of the arrow C) of the filter 20 in the casing 18, and together therewith, is formed substantially in parallel with the second lower guide 44. Further, a separation distance L1 between the first upper guide 46 and the second lower guide 44 is set to be roughly the same or slightly greater than a thickness dimension of the filter 20, in a direction perpendicular to the direction of extension of the first upper guide 46.

The second upper guide 48 is formed such that the rear side thereof in the direction of insertion (in the direction of the arrow C1) ascends upwardly (in the direction of the arrow A) with respect to an end of the first upper guide 46, and extends in a straight line shape up to a curved section 54 of the casing 18 that is formed on the rear side in the direction of insertion (in the direction of the arrow C1). Further, as shown in FIG. 1, concerning the second upper guide 48, an angle of inclination θ2 thereof with respect to an imaginary line extending in the horizontal direction is inclined so as to be smaller than an angle of inclination θ1 of the first upper guide 46 with respect to the imaginary line (θ1>θ2).

Further, the curved section 54 is formed so as to connect the inside air introduction port 22 and the filter accommodating section 38, and is formed to project toward the side of the second upper guide 48 (in the direction of the arrow C2). In addition, an end of the second upper guide 48 is joined to a midway location along the curved section 54.

The third upper guide 50 extends in a straight line shape from an end of the curved section 54 to the inner wall surface 52 of the casing 18 that is formed on the rear side in the insertion direction (in the direction of the arrow C1), and is formed substantially in parallel with the second lower guide 44, which is formed therebelow (in the direction of the arrow B). Further, as shown in FIG. 1, a separation distance L2 between the third upper guide 50 and the second lower guide 44 is set to be roughly the same or slightly greater than a thickness dimension of the filter 20, in a direction perpendicular to the direction of extension of the third upper guide 50. Moreover, the aforementioned separation distance L2 is set to roughly the same dimension as the separation distance L1 between the first upper guide 46 and the second lower guide 44.

More specifically, the first and second upper guides 46, 48 of the guide member 40 are formed in a mountain-like shape with a substantially central portion thereof projecting downwardly (in the direction of the arrow B).

The filter insertion opening 36, for example, opens with an elongate rectangular shape in cross section in a widthwise direction of the casing 18, and an attachment section 56 is provided, which projects out slightly with respect to a side surface of the casing 18, and in which a filter cover (cover member) 55 is installed. The opening area of the attachment section 56 is set to a size corresponding to the cross-sectional area of the filter 20, to be described later.

The filter cover 55 is formed to cover the filter insertion opening 36, and includes a base section 58, a pair of wall members 60a, 60b formed on an end of the base section 58 and which project out with respect to the base section 58, and a supporting piece 62 disposed between the one wall member 60a and the other wall member 60b.

The base section 58 is formed in a plate-like shape with a rectangular cross section so as to cover the filter insertion opening 36, and the respective wall members 60a, 60b are formed in the vicinity of an upper end and a lower end along a height direction perpendicular to the widthwise direction of the base section 58.

The wall members 60a, 60b, for example, project out at a predetermined height roughly perpendicularly with respect to the base section 58, and when the filter cover 55 is installed in the filter insertion opening 36, by being inserted into the interior of the attachment section 56 and engaging with the attachment section 56, the filter cover 55 is fixed in a state of covering the filter insertion opening 36.

Further, the supporting piece 62 projects out roughly perpendicularly with respect to the base section 58 in the same manner as the wall members 60a, 60b, and is formed substantially in parallel with the wall members 60a, 60b. When the filter 20 is accommodated in the interior of the casing 18 through the filter insertion opening 36, another end 20b of the filter 20 is held by the supporting piece 62 of the filter cover 55. More specifically, the supporting piece 62 abuts against (contacts) the end of the filter 20 and functions as a pressing member to retain the filter 20.

Further, when the filter cover 55 is installed in the filter insertion opening 36 (attachment section 56), the supporting piece 62 is arranged downwardly (in the direction of the arrow B) facing toward the first upper guide 46, is substantially parallel with the first upper guide 46, and a separation distance L1 between the supporting piece 62 and the first upper guide 46 is set to be roughly the same or slightly greater than the thickness dimension of the filter 20. More specifically, when installed in the filter insertion opening 36, the supporting piece 62 is disposed at a position that forms a straight line shape with the second lower guide 44.

Figure 2:
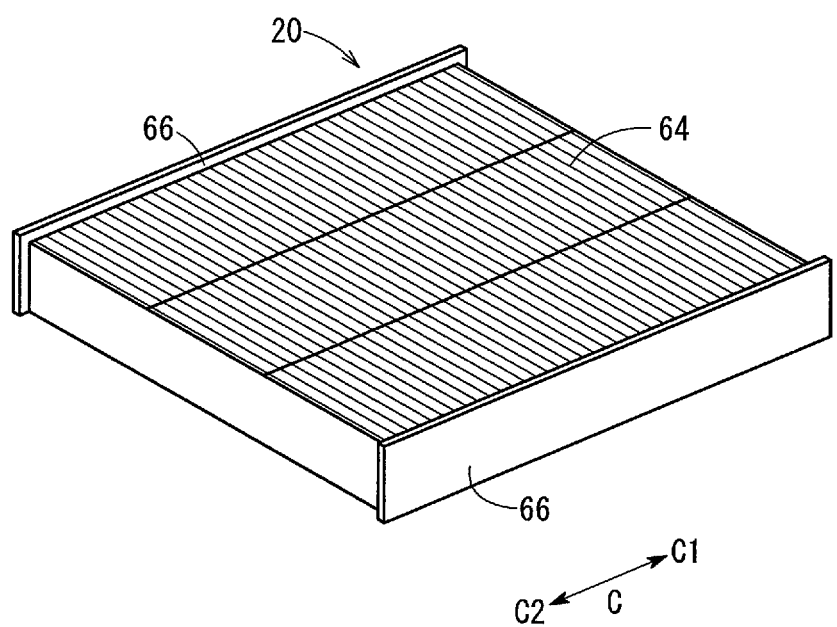
FIG. 2 is an exterior perspective view of the inside/outside air switching unit of FIG. 1.
Figure 3:
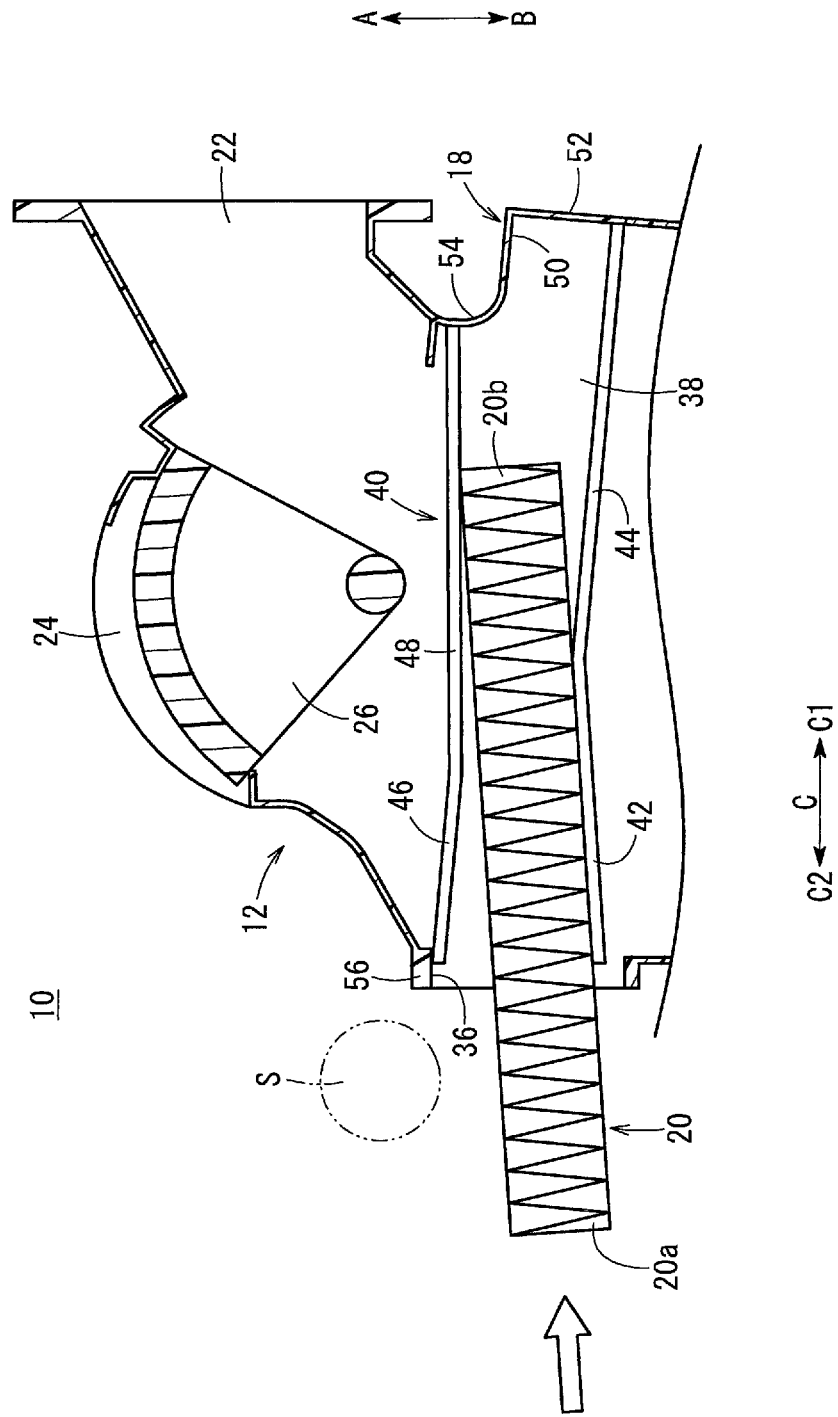
FIG. 3 is an enlarged cross-sectional view showing a condition in which a filter begins to be inserted with respect to the inside/outside air switching unit of FIG. 1.

As shown in FIGS. 2 and 3, the filter 20, for example, is made up from a core member 64 formed by repeatedly folding a non-woven fabric multiple times in a wavy pattern, and a pair of guide tapes 66 pasted on both side portions of the core member 64. Further, the filter 20 is formed with a thickness dimension that is the same or slightly smaller than the height dimension of the filter insertion opening 36. In addition, when the filter 20 is inserted into the interior of the casing 18 from the filter insertion opening 36, the guide tapes 66 move while in sliding contact with the guide member 40 of the casing 18. Therefore, the core member 64 can avoid coming into direct contact with the casing 18.

Further, the filter 20 is inserted in a direction perpendicular to the bent creases thereof (in the direction of the arrow C1), and one end 20a on the side of the filter insertion opening 36 (in the direction of the arrow C2) is retained by the supporting piece 62 of the filter cover 55 that is installed in the filter insertion opening 36.

As shown in FIGS. 1 and 3, the switching damper 26 is formed in a fan shape in cross section and disposed rotatably through a support shaft by a drive means such as a non-illustrated actuator or the like. Further, the switching damper 26 is disposed at a position facing toward the outside air introduction port 24 or the inside air introduction port 22 in the interior of the casing 18, and by rotating the switching damper 26 to a position facing the outside air introduction port 24, the outside air introduction port 24 is closed, and an inside air introducing state is brought about in which the inside air introduction port 22 is open (see FIG. 1). On the other hand, by rotating the switching damper 26 to a position facing the inside air introduction port 22, switching is carried out to an outside air introducing state in which the inside air introduction port 22 is closed, and the outside air introduction port 24 is open.

The vehicular air conditioning device 10 according to the present embodiment is constructed basically as described above. Next, a case will be described in which the filter 20 is installed in the inside/outside air switching unit 12 of the vehicular air conditioning device 10. Herein, as shown in FIGS. 3 through 4B, a condition will be described in which, in a state in which the vehicular air conditioning device 10 is mounted in a vehicle, a steering stay S for supporting a steering device is arranged in proximity to an upper area (in the direction of the arrow A) of the filter insertion opening 36 in the inside/outside air switching unit 12.

The steering stay S, for example, extends with a circular shape in cross section along the widthwise direction of the vehicular air conditioning device 10 in a perpendicular manner to the insertion direction (the direction of the arrow C) of the filter 20.

At first, in the condition shown in FIG. 1, the filter cover 55 is taken out from the casing 18 of the inside/outside air switching unit 12, and in a state in which the filter insertion opening 36 is opened to the exterior, a non-illustrated operator grips the filter 20 and inserts the other end 20b side of the filter 20 into the filter insertion opening 36. At this time, lower surfaces of the guide tapes 66 of the filter 20 are placed in abutment against the first lower guide 42 of the guide member 40 in the interior of the casing 18, and an upper angled portion of the other end 20b on the rear side thereof is inserted toward the rear side in a state of abutment against the second upper guide 48, whereby the other end 20b side is inserted progressively in a condition of being angled at a predetermined angle upwardly (in the direction of the arrow A) with respect to the one end 20a side (see FIG. 3).

Owing thereto, the side on the one end 20a of the filter 20, which is gripped by the operator and resides at the exterior of the casing 18, can assume a state of being positioned downwardly (in the direction of the arrow B) while being separated at a predetermined spacing with respect to the steering stay S, and thus the insertion operation of the filter 20 can be carried out without the filter 20 coming into contact with the steering stay S.

Figure 4A:
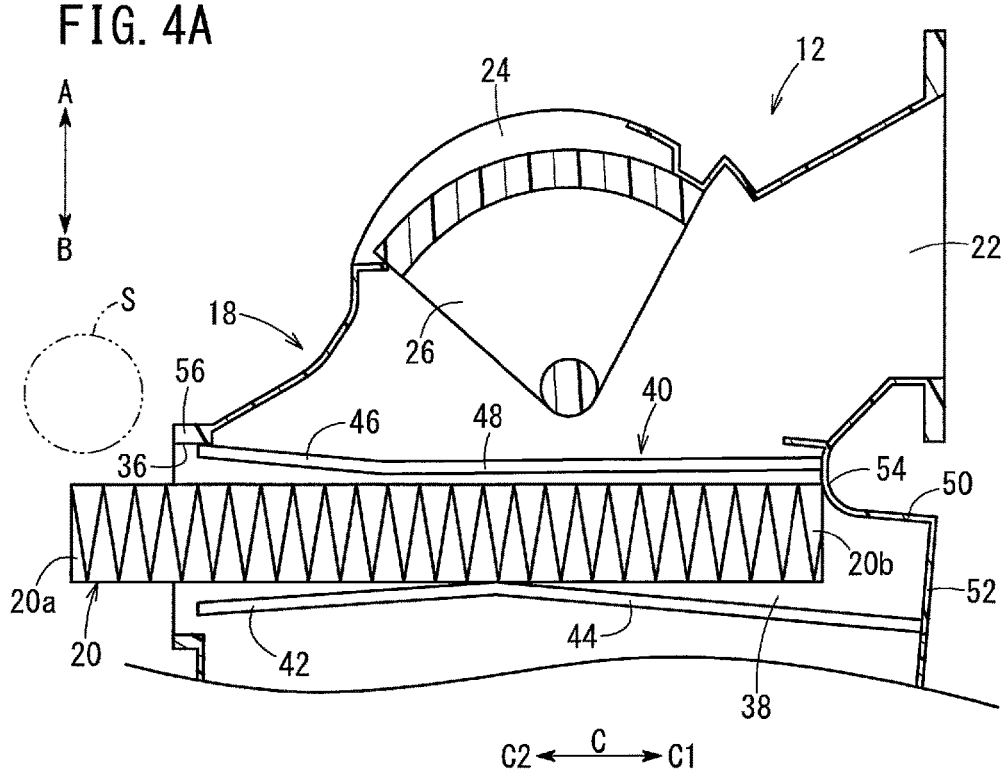
FIG. 4A is an enlarged cross-sectional view showing a condition in which the filter is inserted further deeply with respect to the inside/outside air switching unit of FIG. 3.
Figure 4B:
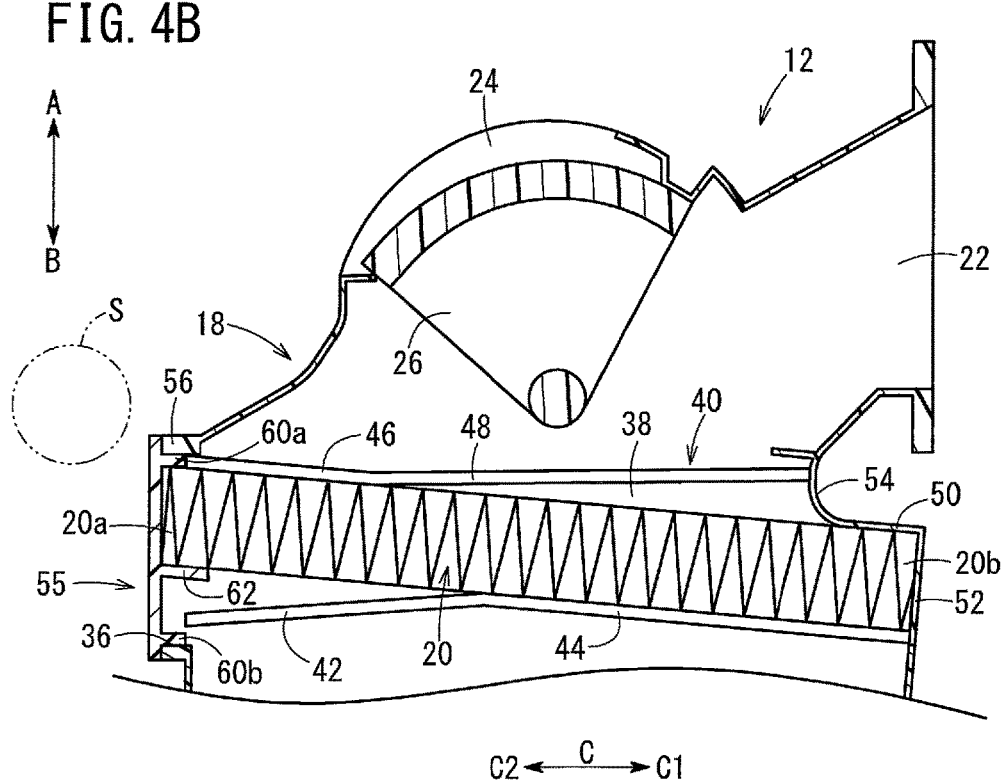
FIG. 4B is an enlarged cross-sectional view showing a condition in which the filter is inserted further deeply from the inserted state of the filter of FIG. 4A, is accommodated completely, and a filter cover is installed.

Next, by inserting the filter 20 further toward the rear, as shown in FIG. 4A, the upper angled portion of the other end 20b comes into abutment against the curved section 54, and is gradually guided in a downward direction (in the direction of the arrow B) along the curved section 54. Therefore, in a state in which the lower surface of the filter 20 abuts against a border site between the first lower guide 42 and the second lower guide 44, the filter 20 is rotated so that the other end 20b side thereof moves downward (in the direction of the arrow B), and the one end 20a thereof moves upwardly (in the direction of the arrow A) to thereby bring about a substantially horizontal condition.

In this case, because the one end 20a of the filter 20 which is on the outer side of the casing 18 has already moved more closely toward the side of the casing 18 (in the direction of the arrow C1) than the steering stay S, even if the one end 20a is tilted slightly upward (in the direction of the arrow A), the filter 20 does not come into contact with the steering stay S.

At this time, as shown in FIG. 4A, the filter 20 is in a state of being supported at two points, with the other end 20b of the filter 20 abutting against the curved section 54, and a substantially central part of the lower surface thereof abutting against the border site between the first lower guide 42 and the second lower guide 44.

Then, when the filter 20 is inserted further into the rear side in the insertion direction (in the direction of the arrow C1), as shown in FIG. 4B, the other end 20b thereof is moved from the curved section 54 to the third upper guide 50. Consequently, the side on the other end 20b of the filter 20 is inclined downwardly (in the direction of the arrow B) again at a predetermined angle of inclination, together with being guided toward the rear side in the insertion direction (in the direction of the arrow C1), in a state with the lower surface on the side of the other end 20b being placed in abutment against the second lower guide 44. Accompanying the other end 20b side of the filter 20 being tilted, the one end 20a side is tilted upwardly, and the upper surface thereof is guided toward the rear side in the insertion direction (in the direction of the arrow C1) in a state of abutment against the first upper guide 46.

More specifically, a state is brought about in which the other end 20b side of the filter 20 is retained by the second lower guide 44 and the third upper guide 50, whereas the one end 20a side thereof is retained by the first upper guide 46.

Finally, as shown in FIG. 4B, the other end 20b of the filter 20 is inserted until it comes into abutment against the inner wall surface 52 of the rear side in the insertion direction (in the direction of the arrow C1), and after the one end 20a side thereof has been accommodated completely in the interior of the filter insertion opening 36, the filter cover 55 is installed such that the pair of wall members 60a, 60b and the supporting piece 62 are disposed on the side of the filter insertion opening 36 (in the direction of the arrow C2).

In addition, the filter insertion opening 36 is covered by the filter cover 55, together with each of the wall members 60a, 60b engaging with respect to the attachment section 56 of the filter insertion opening 36, whereby the filter insertion opening 36 is closed in a state with the filter 20 being accommodated in the interior of the casing 18.

Further, with the supporting piece 62 of the filter cover 55 holding the lower angled portion of the one end 20a on the filter 20, the other end 20b of the filter 20 is retained together with the upper surface and the lower surface sides thereof by the third upper guide 50 and the second lower guide 44, and the one end 20a of the filter 20 is retained together with the upper surface and the lower surface sides thereof by the first upper guide 46 and the supporting piece 62 of the filter cover 55.

Consequently, the installation operation of the filter 20 in the casing 18 of the inside/outside air switching unit 12 is brought to an end. Moreover, at the time that the filter 20 is installed, the core member 64 thereof is not placed in contact with respect to the guide member 40, and only the guide tapes 66 disposed on both side portions move while in contact with the guide member 40.

In the foregoing manner, according to the present embodiment, in the inside/outside air switching unit 12 of the vehicular air conditioning device 10, on both side surfaces of the casing 18, there is provided the guide member 40 that guides the filter 20 to the rear side in the insertion direction (in the direction of the arrow C1) from the filter insertion opening 36, and the guide member 40 includes the first lower guide 42, which is inclined upwardly (in the direction of the arrow A) toward the rear side in the insertion direction from the filter insertion opening 36, and the second lower guide 44, which is inclined downwardly (in the direction of the arrow B) from a midway location of the insertion direction (the direction of the arrow C).

Therefore, when the filter 20 is inserted into the interior of the casing 18 through the filter insertion opening 36, i.e., when insertion thereof is started, by inserting the filter 20 along the first lower guide 42, the other end 20b on the rear side of the casing 18 in the direction of insertion is inserted in an upwardly inclined state (in the direction of the arrow A), whereas the one end 20a is inserted in a downwardly inclined state (in the direction of the arrow B). Therefore, for example, even in the case that a vehicle body side structural member such as the steering stay S or the like is arranged in proximity to an upper area of the filter insertion opening 36 (in the direction of the arrow A), the insertion operation can be performed while the filter 20 is distanced suitably and does not come into contact with the vehicle body side structural member.

Further, since the guide member 40 includes the second lower guide 44, which is inclined downwardly (in the direction of the arrow B) toward the rear side in the direction of insertion (in the direction of the arrow C1) from a midway location in the insertion direction, the filter 20 is capable of being accommodated so that the other end 20b side thereof is first inclined upwardly (in the direction of the arrow A), and then the other end 20b side thereof is tilted to be inclined downwardly (in the direction of the arrow B).

As a result, in the inside/outside air switching unit 12, since a large distance from the lower surface of the filter 20 to the air blowing passage 34 of the blower case 16 can be assured, blown air resistance when air flows under a driving action of the blower 14 can be reduced, and together therewith, by the filter 20 being accommodated in an inclined state such that a rear side thereof in the insertion direction (in the direction of the arrow C1) is downwardly oriented (in the direction of the arrow B) from the filter insertion opening 36, when the filter cover 55 is removed, sliding down of the filter 20 to the outside from the filter insertion opening 36 along the guide member 40 under the action of gravity is prevented.

Furthermore, in the filter 20, by pasting the guide tapes 66 to both side portions of the core member 64 that is made up from a folded non-woven fabric, when the filter 20 is inserted into the interior of the casing 18, it is capable of moving along the guide member 40 via the guide tapes 66, and the core member 64 does not come into direct contact with respect to the casing 18. Therefore, a replacement operation for the filter 20 can be performed without damaging the non-woven fabric of the core member 64, and along therewith, the durability of the filter 20 can be enhanced.

Further still, on the filter cover 55 that is used for closing the filter insertion opening 36, the supporting piece 62 is provided which is capable of retaining the lower angled portion of the one end 20a of the filter 20. Therefore, by installing the filter cover 55 in a state with the filter 20 accommodated in the filter insertion opening 36, the one end 20a side of the filter 20 is supported reliably by the supporting piece 62, and looseness or rattling of the filter 20 in the interior of the casing 18 can reliably be prevented.

Still further, in the casing 18 of the inside/outside air switching unit 12, the other end 20b of the filter 20 that is arranged in a downwardly oriented manner (in the direction of the arrow B) is disposed in proximity to the inside air introduction port 22. In this manner, by disposing the other end 20b side of the filter 20, for which it is typically difficult to secure a separation distance between the air blowing passage 34 and the filter 20, in a downwardly oriented manner (in the direction of the arrow B), the inside/outside air switching unit 12 can be made smaller in scale as a whole, while in addition, since the filter 20 is inclined in facing relation to the inside air introduction port 22, compared to a case of being substantially horizontally disposed, the air that flows from the side of the casing 18 to the side of the air flowing passage 34 is capable of flowing smoothly.

Further, in the foregoing description, although a case has been described in which the filter 20 is accommodated in the interior of the casing 18, even in the case that the filter 20, which is accommodated in the casing 18, is taken out for the purpose of exchanging the filter 20, the filter can be taken out from the filter insertion opening 36 under a condition in which the one end 20a of the filter is inclined downwardly (in the direction of the arrow B) under a guiding action of the first lower guide 42. Therefore, at the time that the filter 20 is taken out, the removal operation therefor can be carried out while suitably avoiding the steering stay S.

The vehicular air conditioning device according to the present invention is not limited to the aforementioned embodiment, and it is a matter of course that various additional or modified structures may be adopted therein without deviating from the essential gist of the present invention.

The invention claimed is:

1. An air conditioning device for a vehicle, comprising a casing, an introduction port formed in the casing and inside air or outside air being introduced through the introduction port, a blower configured to take in air through the introduction port under a driving operation, and an involute shaped air blowing passage, the air that is taken in by the blower being blown out through the air blowing passage, and further comprising an inside/outside air switching unit, a filter being accommodated in an interior of the inside/outside air switching unit through an insertion opening that is formed in the casing,
wherein a guide member configured to guide the filter along an insertion direction from the insertion opening to the interior is provided on an inner wall surface of the casing, and wherein the guide member, at a time that the filter begins to be inserted from the insertion opening, inclines a rear side in the insertion direction of the filter upwardly, and further tilts the filter midway during insertion thereof, whereby when the filter is accommodated, a front side in the insertion direction of the filter is in an upwardly inclined state,
wherein the guide member comprises:
a first lower guide inclined upwardly from a lower end of the insertion opening toward a rear side in the insertion direction;
a second lower guide inclined downwardly from an end on the rear side in the insertion direction of the first lower guide;
a first upper guide extending from an upper end of the insertion opening toward the rear side in the insertion direction, and being formed in parallel with and separated at same distance as a thickness of the filter with respect to a line of extension of the second lower guide;
a second upper guide extending from an end on the rear side in the insertion direction of the first upper guide toward the rear side, and including an angle thereof with respect to a horizontal direction that is smaller than an angle of the first upper guide with respect to the horizontal direction; and
a third upper guide formed on the rear side in the insertion direction with respect to the second upper guide, and formed on a line of extension of the first upper guide.

2. The air conditioning device for the vehicle according to claim 1, the filter comprising:
a core member formed by repeatedly folding a non-woven fabric; and
guide tapes pasted on side portions of the core member and configured to support a shape of the core member;
wherein the filter is guided along the insertion direction by sliding of the guide tapes with respect to the guide member.

3. The air conditioning device for the vehicle according to claim 1, wherein a cover member is installed in the insertion opening in a state with the filter accommodated inside the casing, and a supporting piece that holds a front side in the insertion direction of the filter is disposed on the cover member.

4. The air conditioning device for the vehicle according to claim 1, wherein the introduction port is formed in the casing directly above a downward end of the filter that is arranged in a downwardly oriented manner, the end disposed on the rear side in the insertion direction.

* * * * *